June 16, 1959

R. L. SMIRL 2,890,605

TRANSMISSIONS

Filed Jan. 11, 1957

Inventor:
Richard L. Smirl
By: Keith J. Bleuer Atty.

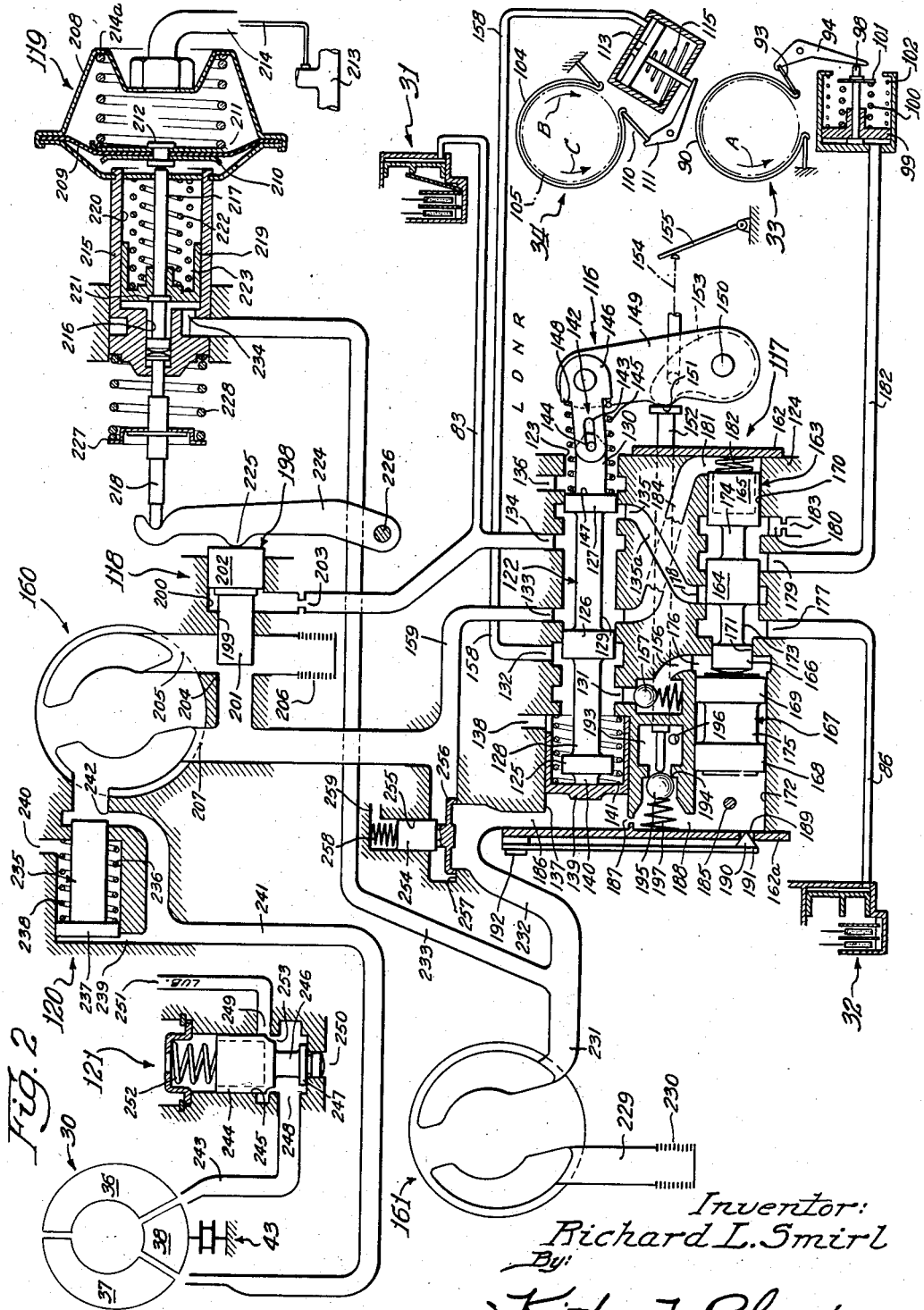

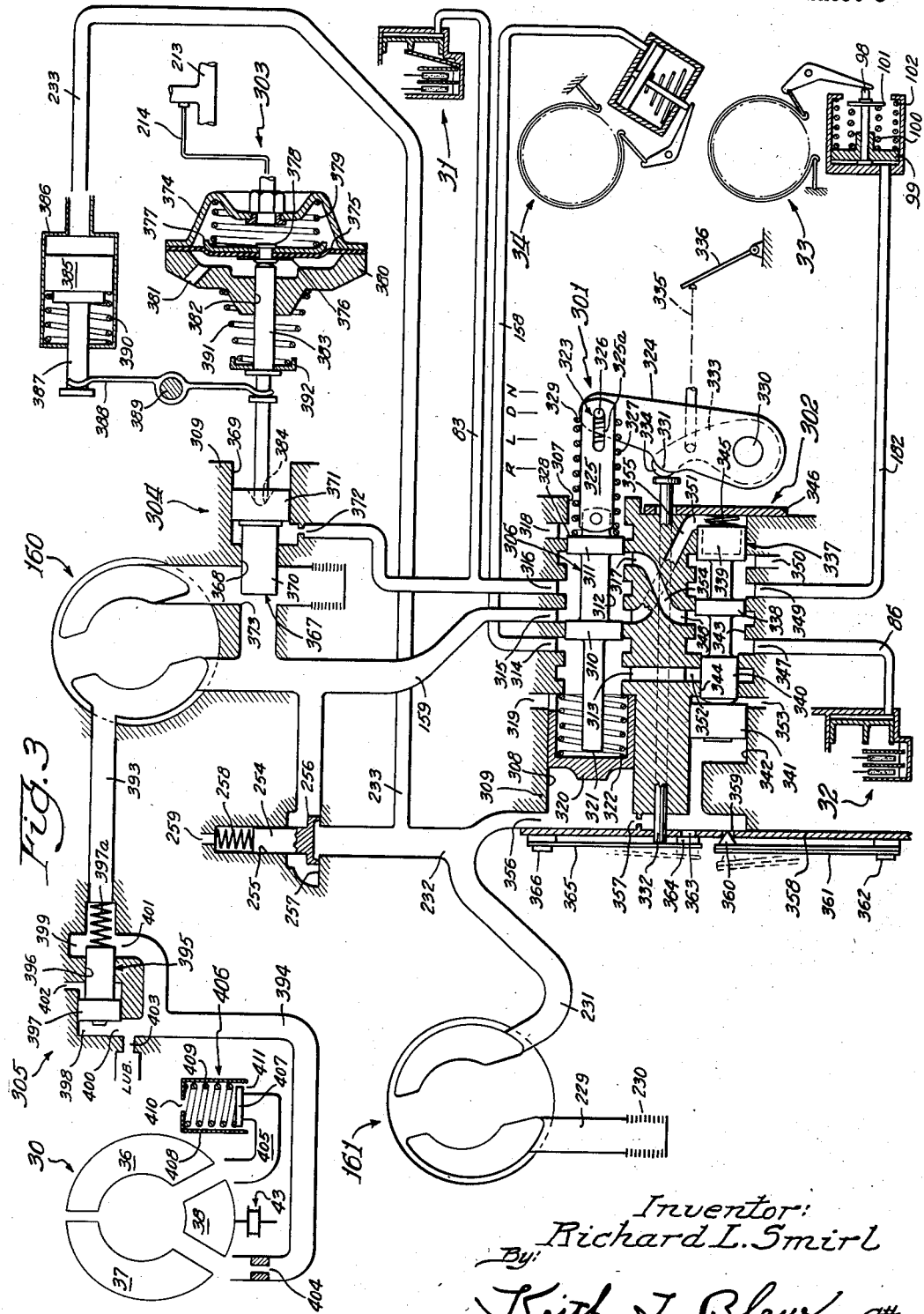

United States Patent Office 2,890,605
Patented June 16, 1959

2,890,605

TRANSMISSIONS

Richard L. Smirl, La Grange Park, Ill., assignor to Borg-Warner Corporation, Chicago, Ill., a corporation of Illinois Application January 11, 1957, Serial No. 633,651

2 Claims. (Cl. 74—752)

My invention relates to transmissions for automotive vehicles and more particularly to such transmissions of the hydraulic type.

An object of the present invention is to provide a simplified hydraulic circuit for the transmission disclosed in Wayman application Serial Number 166,136, filed June 5, 1950.

Another object of the invention is to provide an inhibitor plunger for the manual selector valve of the hydraulic circuit which will prevent shifting of the transmission into low and reverse at high vehicle speeds but will permit a shift to low at reduced vehicle speeds.

Another object of the invention is to provide means for connecting the manually controlled selector valve to the usual selector lever whereby the selector lever can be moved from its "Drive" position to its "Low" position above a certain speed without moving the selector valve.

It is a further object of the invention to provide a shift of the selector valve to its "Drive" position from its "Low" position when a safe speed is exceeded in its "Low" speed position without moving the selector lever.

The invention consists of the novel constructions, arrangements and devices to be hereinafter described and claimed for carrying out the above stated objects and such other objects as will appear from the following description of the preferred embodiments of the invention illustrated with reference to the accompanying drawings, wherein:

Fig. 2 is a diagram showing hydraulic controls for the transmission; and

Fig. 3 is a diagram showing a modified form of the transmission controls.

Like characters of reference designate like parts in the several views.

Figure 1:
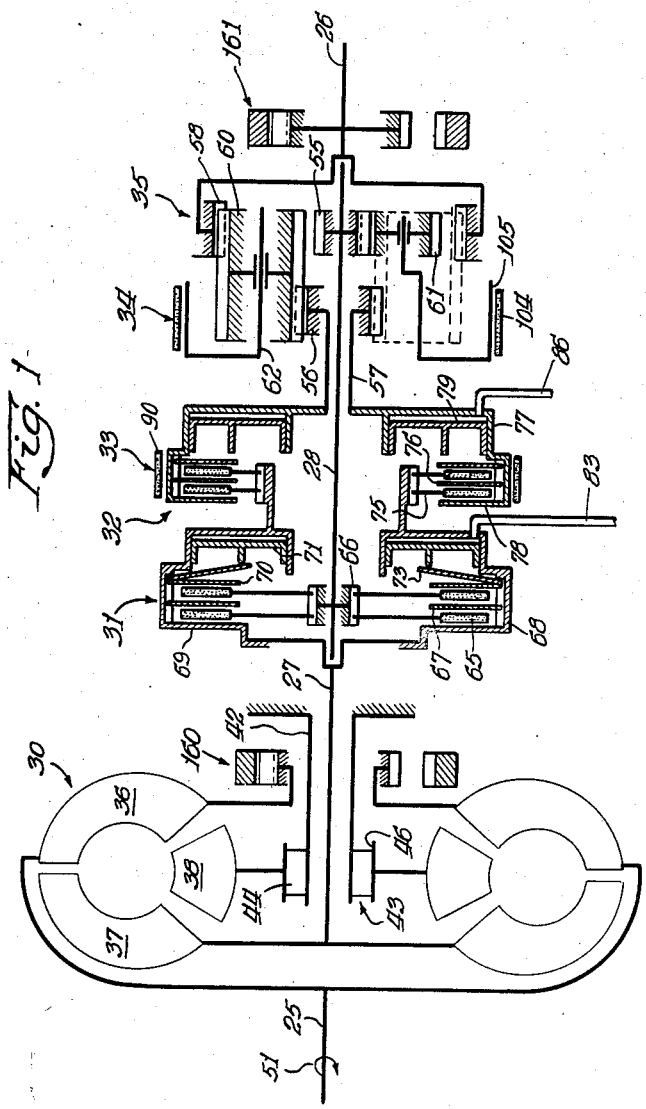
Fig. 1 is a longitudinal sectional view of a transmission embodying the principles of the invention.

Referring now in particular to Fig. 1 of the drawings, the transmission may be seen to comprise a drive shaft 25, a driven shaft 26 and intermediate shafts 27 and 28. The shaft 25 may be the usual crankshaft of the vehicle engine, and the shaft 26 may be connected by any suitable means (not shown) with the driving road wheels of the vehicle. The shafts 27 and 28 are in effect piloted with respect to the shafts 25 and 26. The transmission comprises in general, a hydraulic torque converter 30, hydraulically operated friction clutches 31 and 32, hydraulically operated friction brakes 33 and 34 and a planetary gear set 35.

The hydraulic torque converter 30 comprises a vaned impeller element 36, a vaned rotor or driven element 37 and a vaned stator or reaction element 38. The impeller 36 is driven from the drive shaft 25 and the rotor 37 is fixed to the intermedeiate shaft 27. The stator 38 is rotatably disposed on a stationary sleeve 42, and a one-way brake 43 is disposed between the stator and the sleeve 42. The one-way brake 43 may be of any suitable construction, and, in the illustrated embodiment, comprises a plurality of tiltable sprags 44 disposed between the sleeve 42 and an outer race 46 fixed with respect to the stator 38. The one-way brake 43 is so arranged as to allow a free rotation of the stator 38 in the forward direction, that is in the same direction in which the drive shaft 25 rotates and which is indicated by the arrow 51 and prevents rotation of the stator in the reverse direction.

The torque converter 30 functions in a manner well known for such torque converters for driving the rotor or driven element 37 at an increased torque with respect to the torque impressed on the impeller 36 of the converter. The vanes of the stator 38 function to change the direction of flow of fluid between the rotor and impeller so as to provide this increased torque on the driven element 37. In this case the reaction on the stator 38 is in the direction reverse to the rotation of the drive shaft 25, so that the one-way brake 43 engages and prevents rotation of the stator in this direction. When the speed of the driven element or rotor 37 reaches a predetermined value, the reaction on the vanes of the stator 38 changes in direction, tending to rotate the stator in the forward direction, and the brake 43 releases and allows such rotation of the stator. In this case, the torque converter 30 functions as a simple fluid coupling to drive the rotor 37 at substantially the same speed and with no increase in torque with respect to the impeller 36.

The planetary gear set 35 comprises a sun gear 55 which is fixed on the shaft 28, a second sun gear 56 fixed on a sleeve portion 57 which is rotatable on the shaft 28, a ring gear 58 fixed with respect to the driven shaft 26, a plurality of planet gears 60, a plurality of planet gears 61 and a planet gear carrier 62. Each planet gear 60 and each of the planet gears 61 is rotatably disposed in the carrier 62. The gear carrier 62 is rotatably disposed with respect to the shaft 28 and shaft portion 57 by any suitable bearings. The planet gears 61 are each in mesh with the sun gear 55 and also with a planet gear 60. The gears 60 are also in mesh with the ring gear 58, and the gears 60 are in mesh with the sun gear 56.

The clutch 31 is arranged to connect the shaft 27 driven by the rotor 37 with the shaft 28 and the sun gear 55 formed thereon. The clutch 31 comprises clutch discs 65 splined on to a hub member 66 which is fixed on the shaft 28. The clutch also comprises clutch discs 67 interleaved between the discs 65 and fixed within a member 68 rotatably disposed on the shaft 28 and fixed to the shaft 27 so as to be driven by the latter shaft.

The clutch 31 comprises a movable pressure plate 70 splined within the member 68 and adapted to press the friction discs 65 and 67 together in frictional engagement between it and the enlarged portion 69 which acts as a pressure member on the other side of the discs. An annular piston 71 is provided for actuating the movable pressure plate 70. Pressure from the piston 71 is transmitted to the pressure plate 70 through a spring strut 73. The strut 73 at its inner periphery is acted on by the piston 71, so that its inner periphery moves axially with respect to its outer periphery and moves the pressure plate 70 which is acted on by the strut 73 at intermediate points thereof. The resilient action of the ring 73 functions to return the piston back into its illustrated position when fluid pressure, applied as will be hereinafter described, is released from the piston.

The clutch 32 is arranged to connect the part 68 and thereby the shaft 27 with the shaft portion 57 and sun gear 56 and comprises clutch discs 75 splined on to the member 68 and clutch discs 76 splined within a member 77 which is fixed to the shaft portion 57. A pressure plate portion 78 is fixed to the member 77 on one side of the clutch discs, and an annular hydraulic piston 79 is provided on the other side of the discs for compressing the discs between it and the pressure plate portion 78.

Fluid under pressure is supplied to the piston 71 by a passage 83. A passage 86 is provided for supplying fluid under pressure to the piston 79. The passages 83 and 86, which are stationary, are connected with the rotatable parts 68 and 77 by any suitable manifold means (not shown).

The brake 33 comprises a brake band 90 adapted to be contracted on the part 77 for thereby braking the sun gear 56. One end of the band 90 is fixed, and the other end is adapted to have force applied to it for tightening the band on the part 77 by means of a strut 93 disposed between this end of the band and one end of a lever 94. The lever 94 is acted on at its opposite end by a shaft 98 which is resiliently connected to a piston 99 by a coil spring 100. The piston 99 is slidable on the shaft 98 and the spring 100 is disposed between the piston and a flange 101 on the shaft. A coil spring 102 yieldably holds the piston 99 in its brake disengaging position.

The brake 34 comprises a brake band 104 adapted to be contracted on a drum portion 105 of the planetary gear carrier 62. The band 104 has one of its ends fixed, and the band 104 at its other end is acted on by a strut 110 which is disposed between this end of the band and a lever 111 which is acted on by a piston 113. A spring 115 is provided for yieldably holding the piston 113 in its brake disengaging position.

In operation, the transmission has a neutral condition and provides low, intermediate and high speed ratios in forward drive and a drive in reverse. The transmission is in neutral condition when the clutches 31 and 32 and the brakes 33 and 34 are disengaged. For ordinary driving conditions of the vehicle, the transmission is operated in its Drive range which includes the intermediate and high speed ratios.

The intermediate speed ratio power train is completed by engaging the clutch 31 and the brake 33. The clutch 31 is engaged by applying fluid pressure to the piston 71 through the conduit 83. Engagement of the brake 33 may be obtained by applying fluid pressure to the piston surface 98b to move the piston 98 to the right as seen in Fig. 1 and rotate the lever 94 counterclockwise and thereby tighten the band 90 on the part 77. The intermediate speed power train exists from the drive shaft 25 through the torque converter 30 to the intermediate shaft 27 and thence through the clutch 31 to the shaft 28 and through the planetary gear set 35 to the driven shaft 26. The brake 33 is effective to hold the part 77 stationary and to brake the sun gear 56 of the planetary gear set, so that the sun gear 56 constitutes the reaction element of the gear set. The shaft 28 is driven as just described, and the sun gear 55 of the gear set 35 thus constitutes the driving element of the gear set. The drive is transmitted through the planet gears 61 and 60 to the ring gear 58 driving the driven shaft 26. Since there are sets of two planet gears 61 and 60 between the sun gear 55 and the ring gear 58, and the sun gear 56 in mesh with the gears 60 functions as the reaction element of the gear set, the ring gear 58 and thereby the shaft 26 are driven at a reduced speed, intermediate speed ratio, with respect to the shaft 27. At this point it may be noted that the direction of reaction on the sun gear 56 and the part 77 is in the reverse direction as indicated by the arrow A in Fig. 2. This direction is opposite the direction of rotation of the drive shaft 25 indicated by the arrow 51, and the part 77 in tending to rotate in this direction augments the action of the strut 93 in engaging the band 90 and causes increased band engagement, since the part 77 tends to carry the end of the band acted on by the strut along with the part 77 in the same direction in which this end of the band is urged by the strut. It is apparent that the band 90 wraps or is partially self-energizing for this rotative tendency of the part 77.

The high speed ratio power train through the transmission, which constitutes a substantially direct drive between the shafts 25 and 26, may be obtained by engaging the clutch 32, allowing the clutch 31 to remain engaged. The brake 33 is disengaged at this time. The clutch 32 may be engaged by applying fluid pressure through the passage 86 to the piston 79. In this drive, the shaft 27 is driven through the torque converter 30 from the drive shaft 25 as in intermediate speed drive. The shaft 27 is connected through the clutch 31 to drive the sun gear 55 as was the case in intermediate speed drive.

The clutch 32 functions to connect the part 68, which in turn is connected with the shaft 25, with the part 77 and thereby with the sun gear 56 splined thereto. Thus both the sun gear 55 and also the sun gear 56 are driven by the shaft 27, and as is well known in connection with planetary gear sets, when two elements of the gear set are driven at the same speed, the gear set becomes locked up so that all of its gears and elements rotate as a unit, and there is thus a direct drive between the shaft 27 and driven shaft 26. A substantially direct drive generally exists in this power train between the shafts 25 and 26, since the converter 30 may be expected to function as a simple fluid coupling generally in this drive.

The low speed forward drive may be obtained by engaging the clutch 31 and the brake 34. The clutch 31 is engaged as has been previously described, and the brake 34 may be engaged by applying fluid pressure on the piston 113 causing a movement of the piston 113 against the action of the spring 115 and a rotation of the lever 111 in the clockwise direction, so as to pull the band 104 about the drum portion 105. Engagement of the brake 34 causes the planet gear carrier 62 to function as the reaction element of the gear set, and the sun gear 55 is driven from the shafts 25 and 27 substantially as in intermediate speed drive. Since there are sets of the two planet gears 61 and 60 between the sun gear 55 and ring gear 58, the ring gear 58 is driven at a reduced speed drive with respect to the sun gear 55 and shaft 28, and the speed of the ring gear 58 and shaft 26 connected therewith is lower than their speed relative to the shaft 28 for intermediate speed drive. For most vehicle driving conditions when low speed drive is used, the rotor 37 is driven at increased torque, and the gear set 35 is connected in tandem with the converter 30 also increases the torque to provide a relatively great over-all torque ratio between the shafts 25 and 26. It may be noted that the reaction on the planet gear carrier 62 and on the drum 105 for low speed forward drive is in the reverse direction indicated by the arrow B in Fig. 2 which is opposite to the direction of rotation of the drive shaft 25, and this reaction or tendency to rotate tends to move the band to unwrap and disengage the band from the drum 105. For this direction of reaction, the brake 34 is thus self-deenergizing and provides a less braking effect than for a case in which this reaction did not exist.

Reverse drive may be obtained through the transmission by engaging the brake 34 and engaging the clutch 32. For this drive, the power train exists from the drive shaft 25 through the torque converter 30 to the intermediate shaft 27 and from thence through the clutch 32 to the sun gear 56 and through the planetary gear set 35 to the driven shaft 26. The brake 34 causes the planet gear carrier to function as the reaction element of the gear set, and since there are only the single planet gears 60 between the sun gear 56 and the ring gear 58, the ring gear 58 will be driven at a reduced speed in the reverse direction with respect to the sun gear 56 and the shaft 27 in accordance with well known principles of operation of planetary gear sets. For this drive, the torque converter 30 generally functions to increase torque, and thus the torque impressed on the driven shaft 26 is the product of the torque increases by the torque converter 30 and the planetary gear set 35. The reaction on the brake drum 105 for reverse drive is in the forward direction as indicated by the arrow C in Fig. 2, that is, in the same direction as the drive shaft 25 rotates. This tendency of the drum 105 to rotate in this direction assists the strut 110 in forcing the band end 109 to move in the direction indicated by the arrow C, and the brake 34 thus wraps or is self-energizing for this direction of reaction so that the braking effect is greater than would be the case if there were no tendency for the drum to rotate. The reaction on the drum 105 is greater for reverse drive than for low forward drive, and hence the brake 34 has been constructed to wrap for the reaction for reverse drive instead of that for low speed forward drive.

Referring now to Fig. 2, the control system for the transmission comprises in general the engine driven pump 160, the vehicle driven pump 161, a manual selector valve 116, an automatic shift valve 117, a pressure control valve 118, a vacuum responsive motor 119 for controlling the valve 118, a pressure reducer valve 120, and a pressure reducing valve 121.

The manual selector valve 116 comprises a valve piston 122 slidably disposed in connected cylindrical cavities 123 and 137 formed in a valve casing 124. The piston 122 is provided with lands 125, 126 and 127 spaced by grooves 128, 129 and 130. The cylindrical cavity 123 is provided with ports 131, 132, 133, 134, 135 and 136. The cavity 137 is provided with port 138. A hollow piston 139 is slidably disposed in the cavity 137 and is adapted to be contacted by an end 140 of the piston 122. A compression spring 141 is disposed between the inner end of the cavity in the hollow piston 139 and an end in the cavity 137.

The valve piston 122 is connected by means of a lost motion connection 142 to a link 146. Link 146 is connected to a lever 149 swingably mounted on a shaft 150. The lever 149 is connected to the usual selector lever (not shown) through suitable linkage (not shown). The lost motion connection between the piston 122 and the link 146 comprises a slot 143 in the link 146 and a pin 144 on the piston 122. A compression spring 145 surrounds the end of piston 122 and the link 146. The ends of the spring 145 rest against an end 147 of land 127 of piston 122 and a stop 148 provided on the link 146. The lever 149 is provided with a projection 151 adapted to make contact with the end of a rod 152 which will hereinafter be described.

A cam plate 153 is swingably mounted on the shaft 150 adjacent the lever 149, and the plate 153 also has a projecting portion 151 adapted to contact the end of the rod 152, similarly to the lever 149. The plate 153 has a link 154 attached thereto, and the link is adapted to be contacted by the accelerator or throttle pedal 155 of the vehicle when the accelerator 155 is moved to a full open throttle position. It will be understood that the usual connections (not shown) between the accelerator 155 and the carburetor of the internal combustion engine of the vehicle are provided and, of course, other more elaborate linkage may be provided between the accelerator 155 and the cam plate 153 by means of which the plate 153 is rotated on the shaft 150 to contact the rod 152 when the accelerator is moved to an open throttle position.

The port 138 of the cavity 137 is an exhaust port adapted to freely discharge fluid to sump. Port 131 of cylindrical cavity 123 is connected with passage 156 through a check valve 157. Port 132 is connected by means of a conduit 158 with the servo-motor piston 113 for engaging the rear brake 34. One of the ports 133 is connected with a pressure supply conduit 159; the port 134 is connected with the conduit 83 for engaging the front clutch 31; the port 135 is connected with a passage 135a; and port 136 is an exhaust port adapted to freely discharge fluid to sump.

The valve casing 124 is provided with end plates 162 and 162a.

The automatic shift valve 117 comprises a piston 163 having lands 164 and 165 of equal diameter; a land 166 having a relatively small diameter; and a piston 167 having lands 168 and 169 of equal diameter. The lands 164 and 165 of the piston 163 are slidable in a cavity 170; the land 166 is slidable in a cavity 171; and the lands 168 and 169 are slidable in a cavity 172. The land 165 is hollowed out and a compression spring 182 is seated therein. The spring 182 is adapted to abut against end plate 162. The piston 163 is provided with grooves 173 and 174, and the piston 167 is provided with a groove 175. The connected cavities 170, 171 and 172 are provided with ports 176, 177, 178, 179, 180 and 181. The port 176 is connected with the passage 156 in the valve casing 124; the port 177 is connected with conduit 86 for engaging the clutch 32; the port 178 is connected with the conduit 135a in the valve casing 124; the port 179 is connected with the conduit 182 for engaging the front brake 33; the port 180 is a bleed port adapted to discharge to sump through a restricted orifice 183; and the port 181 is connected to a passage 184 in the valve casing 124.

Means are provided in the valve casing 124 for limiting the movement of the piston 167 in the cavity 172 and this means comprises a pin 185 passing through the cavity 172.

Fluid pressure from the vehicle driven pump 161 is adapted to be imposed on the hollow piston 139 in the cavity 137 and on the piston 167 in the cavity 172. For this purpose, ports 186 and 187 are provided in cavity 137 and a port 188 is provided in the cavity 172. The port 187 comprises a restricted orifice.

Means for discharging fluid from the cavity 172 is also provided. The plate 162a at the end of the cavity 172 is provided with an orifice 189 therethrough in communication with the cavity 172, and as will be noted, the orifice is sharp edged on both ends. A conical valve element 190 is disposed in the orifice 189 for closing the orifice and this valve element is carried by a resilient sheet metal strip 191 anchored with respect to the plate 162a by means of a stud 192 extending through the strip and plate. The orifice 189 is adapted to discharge fluid into the sump (not shown).

Means under control of the operator of the vehicle are also provided for draining fluid from the cavity 172 to the sump. This means comprises a valved port, the valve being adapted to be actuated by the rod 152. A cavity 193 is provided in the valve casing 124, one end of the cavity being provided with a bore for receiving the rod 152 and the other end having a port 194 acting as a valve seat for ball valve 195. A bleed port 196 is provided for restricted discharge of oil to the sump. A compression spring 197 rests against the end plate 162a at one end thereof and against the ball 195 at the other end tending to hold the valve ball 195 in its port closing position.

The pressure control valve 118 comprises a piston 198 slidably disposed in connected cylindrical cavities 199 and 200. The piston 198 comprises lands 201 and 202 slidably disposed respectively in the cavities 199 and 200. The cavity 199 is open to the inlet of the engine driven pump 160 and the cavity 200 is open to the conduit 83 by way of a restricted orifice 203. The valve piston 198 is adapted to abut against a seat 204 provided in the valve casing 124.

An inlet conduit 205 is provided for the engine driven pump 160. The inlet conduit 205 is provided with an oil screen 206 disposed in the sump (not shown). An outlet cavity 207 is also provided for pump 160. The conduits 205, 207 and 159 are connected as shown. When the valve piston 198 abuts against the seat 204, the outlet cavity 207 of the pump 161 is closed with respect to the inlet cavity 205.

The vacuum motor 119 controls the pressure control valve 118 and comprises a sheet metal casing 208 having a flexible diaphragm 209 fixed therein. A pair of metal washers 210 and 211 are fixed on opposite sides of the diaphragm 209 by means of a stud 212 extending through the washers and the diaphragm. One end of the casing 208 is connected to the air intake manifold 213 of the internal combustion gasoline engine of the vehicle by means of a conduit 214 for applying the vacuum present in the manifold 213 on the right side of the diaphragm 209. A spring 214a is provided between the washer 211 and the end of the casing 208 for restricting the action of the vacuum on the right side of the diaphragm 209. A casing 215 is fixed to the casing 208. The casing 215 has a bore 216 adapted to receive a rod 217. The rod 217 is in contact with a rod 218 at one end and its other end rests on the stud 212.

A piston 219 is slidably disposed in a cylindrical cavity 220 in the casing 215 and the rod 217 is provided with a shoulder 221 adapted to abut against a central portion of the piston 219 through which the rod 217 passes. A pair of compression springs 222 and 223 are provided between the left side of the casing 208 and piston 219. The rod 218, which is in contact with the rod 217 within the cavity 216 of the casing 215, is adapted to act on the piston 198 of the pressure control valve 118 by means of a lever 224 having a projection 225 thereon in contact with the piston 198. The lever 224 is swingably mounted on a stud 226 in the valve casing 124. A washer 227 is fixedly attached to the rod 218 and a compression spring 228 is disposed between the washer 227 and the casing 215 for urging the rod 218 to the left so that the lever 224 bears against the piston 198.

A fluid inlet conduit 229 having a screen 230 is provided for the vehicle driven pump 161. The screen 230 not only functions to strain the oil drawn into the conduit 229 by the pump 161 but also functions as a viscous restriction for conduit 229. A fluid outlet passage or conduit 231 is provided for the pump 161 and the conduit 231 delivers fluid to passages 232 and 233.

A passage 234 is provided in the casing 215 of the vacuum motor 119 in communication with the cylindrical cavity 220 for applying a fluid pressure to the piston 219, and this passage 234 is connected by means of the conduit 233 with the conduit 231.

The pressure reducer valve 120 comprises a piston 235 slidably disposed in cylindrical cavity 236. The piston 235 is provided with a land 237 slidably fitting within the cavity 236. A compression spring 238 surrounds the piston 230 and one end thereof rests against the land 237 of the piston and the other end of the spring rests against the valve casing. The spring 238 urges the piston 230 to the left as seen in the drawings. The cylindrical cavity 236 is provided with ports 239 and 240. The port 239 is connected with an outlet conduit 241 of the engine driven pump 160 for supplying fluid pressure to the torque converter 30 and the port 240 is an exhaust port adapted to freely discharge fluid to sump. The piston 230 is adapted to abut against a seat 242 in the valve casing.

The fluid entering the torque converter 30 from the conduit 241 passes through the torque converter and is discharged to conduits 243 and 251 for providing lubrication to the transmission.

The pressure reducing valve 121 is provided between the conduits 243 and 251 for maintaining a predetermined pressure in the lubrication conduit 251. The valve 121 comprises a piston 244 slidably disposed in a cylindrical cavity 245. The piston 244 slidably fits within the cavity 245 and has an extension 246 provided with a shoulder 247 adapted to seat on the valve casing. The cylindrical cavity has ports 248, 249 and 250. Port 248 is connected with conduit 243; port 249 is connected with the conduit 251; and port 250 is an exhaust port adapted to freely discharge fluid to sump. A compression spring 252 urges the piston 244 to a position closing the port 250. A notch 253 is provided in the piston 244 so that some fluid can escape to the conduit 251 regardless of the pressure maintained in the conduit 243.

A check valve is disposed in the conduit 232 and comprises a valve piston 254 slidably disposed in a cylindrical cavity 255 provided in the valve casing. The piston 254 has an enlarged end 256 adapted to seat on a seat 257 in the conduit 232. A compression spring 258 is provided in the cavity 255 and is disposed between the end of the piston 254 and the adjacent end of the cavity 255. The cavity 255 has a port 259 open to sump.

The transmission controls shown in Fig. 2 automatically provide both low and intermediate speed when the selector valve piston 122 is in its "L" or low position; both intermediate and high speed drives automatically when the selector valve 122 is in its "D" or drive position; and reverse drive when the valve 122 is in its "R" or reverse position. The transmission is maintained in its neutral condition when the valve piston 122 is in its "N" position.

When the selector valve piston is in its "N" position, the land 126 blocks the port 133 with respect to the other ports in the valve 116 and any fluid under pressure in the pressure supply conduit 159 is thus ineffective to provide any actuation of any of the fluid pressure responsive clutches and brakes. It is assumed that the engine of the vehicle is in operation, and the drive shaft 25 is rotating, and the pump 161 provides fluid under pressure to the cavity 207 and the conduit 159.

The pressure of the fluid discharged by the pump 160 is regulated by means of the pressure control valve 118. The output pressure of the pump 160 in the cavity 207 is impressed upon the left end of the pressure control valve piston 198 tending to move it off its seat 204 to permit the fluid discharged by the pump to be relieved in the inlet cavity 205 of the pump so as to maintain the pressure discharged by the pump at a predetermined maximum. The valve piston 198 is moved to the right as seen in Fig. 2 by the pressure discharged from the pump 160 against the action of the spring 228 acting on the piston 198 through the rod 218 and the lever 224, against the action of the springs 222 and 223 acting through the piston 219, the shoulder 221, and the rod 217, and against the action of the spring 214a acting through the washer 210 and the stud 212.

The output pressure of the driven shaft pump 161 is impressed on the piston 219, as will be described; however, since the vehicle is assumed to be stationary in the neutral condition of the transmission, there is no output pressure from the pump 161, and the springs 222 and 223 act with their full force at this time. The manifold pressure is applied to the diaphragm 209 through the conduit 214 to vary the effect of the spring 214a on the piston 198 for varying the pressure from the pump 160 for purposes hereinafter to be described, but such variations of pressure with changes in the manifold vacuum have no function in the neutral condition of the transmission.

When the selector valve piston 122 is moved from its "N" to its "D" position in which it is illustrated, the intermediate speed drive through the transmission is initially completed, and a subsequent change to high speed drive is obtained automatically due to the operation of the automatic shift valve 117. In the "D" position of the selector valve piston 122, fluid under pressure is supplied from the conduit 159 through the port 133, the groove 121 and the port 134. This fluid pressure is transmitted to the pressure plate 70 of the front clutch 31 for engaging the clutch 31 through the conduit 83. At this time the piston 163 is in a position to the left of its illustrated position; the piston 167 abuts against stop 185; and the land 166 of the piston 163 abuts against the land 169 of the piston 167. With the valve 163 in this position; fluid under pressure is supplied through the passage 135a, the port 178, and the groove 174 to the port 179. This fluid pressure is supplied to the conduit 182 and to the piston 98 of the front brake 33 for applying the brake. With the engagement of front clutch 31 and front brake 33, the intermediate speed power train is thus completed.

The pressure in the conduit 159 is maintained at predetermined values by the pressure control valve 118, the pressure varying both with the speed of the vehicle and with the vacuum in the manifold 213. The manifold vacuum is impressed on the diaphragm 209 through the conduit 214 and tends to counteract the effect of the spring 214a which acts through the rods 217 and 218 and the lever 224 on the piston 198 tending to maintain it on its seat 204.

The greater the vacuum in the manifold becomes, with a movement of the vehicle accelerator toward its closed throttle position, the greater will be the counteraction of the diaphragm 209 on the effect of the spring 214a and the greater will be the action of the valve piston 198 to relieve the pressure discharged by the pump 160 and the less will be the predetermined pressure maintained by the valve 118 in the pressure conduit 159 and applied to the front clutch 31 and the front brake 33. Conversely, the less the vacuum is in the manifold 213 with the movement of the accelerator toward its open throttle position, the less will be the effect of the diaphragm 209 and the greater will be the effect of the spring 214a in holding the valve piston 198 on its valve seat 204, so that the pressure output of the pump 160 must rise to a higher value before it is effective to move the piston 198 off its seat 204, and the greater will be the pressure supplied to the front clutch 31 and the front brake 33. Thus, the pressure on the front clutch 31 and the front brake 33 is increased with a throttle opening movement of the accelerator pedal of the vehicle so that the front clutch 31 and the front brake 33 are engaged with sufficient intensity so that they cannot slip due to the increased torque delivered by the vehicle engine with the increased throttle opening. However, since the pressure supplied to the clutch 31 and brake 33 is variable with throttle opening particularly being decreased with throttle closing, a desirably smooth engaging action of the clutch and brake is obtained with the selector valve 122 is first moved into its "D" position.

The effect of the spring 214a just described on the pressure control valve 118 is limited due to the fact that no fixed connection is provided between the stud 212 of the vacuum motor 119 and the rods 217 and 218, so that the stud 212 can at times move out of contact with the rod 217 when the vacuum in the manifold 213 is above a predetermined value. As is well known, the absolute pressure vacuum in the manifold 213, which is the difference of the amount of manifold vacuum subtracted from the value of atmospheric pressure, varies approximately with the torque output of the engine, and the strength of the spring 214a is such that the stud 212 is moved by the diaphragm 209 out of contact with the rod 217 at approximately one quarter of the full output torque of the engine. The stud 212 is out of contact with the rod 217 at closed throttle positions of the vehicle accelerator, under idling conditions of the vehicle engine, and when the vehicle is coasting, and the stud 212 comes into contact with the rod 217 on subsequent decreases of manifold vacuum with increased throttle opening when the output of the vehicle engine has reached about one quarter of its full output torque. One of the basic reasons for providing this limited action of the diaphragm 209 on the rod 217 is that approximately the same pressure effective on the clutch 31 and brake 33 is required so that the clutch and brake do not slip when the vehicle is coasting down a hill with the throttle closed, as is required to maintain the brake from slipping when the vehicle engine is delivering one quarter of its full output torque. With the stud 212 being out of contact with the rod 217, under these conditions the springs 222, 223 and 228 are effective to maintain a certain minimum fluid pressure in the conduit 159 and applied to the clutch 31 and brake 33.

As the vehicle begins to move forwardly, the driven shaft pump 161 begins to discharge fluid under pressure into the conduit 232, the fluid being drawn from the sump through the screen 230 and the conduit 229 into the pump by the pump action. The fluid discharged from the pump 161 flows through the conduit 231, the conduit 232, the port 186, the restricted orifice 187, and the port 188. Fluid pressure from the pump 161 is thus impressed on the piston 139 of the manual selector valve 113 and the piston 167 of the automatic valve 117. Fluid pressure is also exerted on the valve 190 through the straight edged orifice 189.

The discharge from the pump 161 increases with the speed of the vehicle, since the pump is driven from the driven shaft 26 of the transmission. This increased pressure is impressed upon the ends of pistons 139 and 167. Since the piston 139 is seated on the valve casing, as shown, fluid pressure at this time has no effect to move the piston 139. The increased fluid pressure on the piston 167 tends to move the piston 167 to the right against the action of the spring 182.

The fluid pressure in the conduit 233, which increases in accordance with vehicle speed, as has just been noted, is impressed through the port 234 on the piston 219 of the vacuum motor 119, tending to move the piston 219 to the right against the action of the springs 222 and 223. The greater the pressure in the conduit 233 becomes with increases in vehicle speed, the greater the fluid pressure on the piston 219 becomes, counteracting to a greater and greater extent the effect of the springs 222 and 223, so that the springs 222 and 223 have less effect in holding the piston 198 on its seat 204, thereby relieving the fluid pressure discharged from the pump 160 to a greater and greater extent and reducing the pressure discharged by the pump 160 with increases in vehicle speed.

As has been described in connection with the transmission itself, the low speed power train includes the torque converter 30, and in general with such converters, the torque multiplication decreases with increases in vehicle speed. Thus, the pressure effective for holding the clutch 31 and brake 33 engaged for completing the intermediate speed forward drive power train, as the vehicle speed increases, need not be maintained at the high initial value and may be decreased. The vehicle speed variable fluid pressure in the conduit 233 impressed on the piston 219 has this effect, namely, to decrease the fluid pressure from the pump 160 and applied to the clutch 31 and brake 33 as the vehicle speed increases and thereby the torque multiplication in the torque converter 14 decreases.

The pressure in the conduit 159, which is varied in accordance with the speed of the vehicle due to the speed responsive pressure in the conduit 233 impressed on the piston 219 and also with the torque output of the vehicle engine by reason of the manifold pressure impressed on the diaphragm 209 is applied to the clutch 31 and brake 33. This pressure in the conduit 159 increases with engine torque output and decreases with increases in vehicle speed, and the torque output of the torque converter 30 to the shaft 27 varies in substantially the same manner, that is, the output torque of the torque converter 30 increases with the output torque of engine and it decreases with increasing speeds of the vehicle and of the shaft 26 due to the inherent operating characteristics of the hydraulic torque converter of the type shown. The fluid pressure applied to the clutch 31 and brake 33 thus varies in the same manner as the output torque of the hydraulic torque converter 30. The ratio changes from intermediate to high speed drive and from high speed drive to intermediate speed drive are relatively smooth due to the variation in pressure in the supply conduit 159 with output torque of the vehicle engine and speed of the vehicle driven shaft. As has been described, the stud 212 of the diaphragm 209 moves away from the rod 217 when the engine torque output is less than approximately one quarter of its full output torque for maintaining a predetermined lower limit of the pressure in the conduit 159. This maintains the clutches or brakes, as the case may be, engaged when the vehicle is coasting or the engine idling. The piston 219, having the driven shaft pump pressure in the conduit 233 effective thereon, has a corresponding action in moving away from the abutment 221 when a certain speed of the vehicle is reached. This speed corresponds approximately with the speed at which the one-way brake 43 disengages and the torque converter 30 functions as a simple fluid coupling with no torque conversion. There is thereafter no effect on increasing speeds of the vehicle and of the shaft 26 on the pressure in the conduit 159 effective on the clutches or brakes of the transmission for decreasing such pressures, and no such pressure reducing effect is required since there is no further reduction in torque conversion of the hydraulic torque converter 30.

The pressure reducer valve 120 functions to maintain a fluid pressure in the torque converter 30 that varies directly with the line pressures supplied by the pump 160 and present in the conduit 159 and connected conduits. The fluid under pressure discharged by the pump 160 is applied to the right end of the valve piston 235 and tends to move the valve piston 235 to the left. The fluid under pressure discharged by the pump 160 is also applied to the left end of the piston 235 through the port 239. This fluid pressure tends to move the piston 235 to the right against the compression spring 238 to close the port 242. The net effect is to cause the valve 120 to function as a regulator valve maintaining the pressure in the conduit 241 at a certain fraction of the pressure discharged by the pump 160 and regulated by the pressure control valve 118. Thus, the pressure in the converter 30 varies as the line pressure in the conduit 159 and increases with throttle opening and decreases with increases in vehicle speed. In order to prevent cavitation of fluid in the torque converter, it is necessary to increase the pressure in the converter with increases in torque conversion by the converter. The pressure in the converter is thus caused to vary directly with line pressure in the conduit 159 to increase with the increased opening of the throttle of the vehicle engine and increase with decreasing speeds of the vehicle.

The pressure in conduits 159 and 184, which increases with engine throttle opening, is impressed on the right end of the piston 163. As the speed of the vehicle in intermediate speed increases, the pressure from the driven shaft pump 161 increases and when the pressure from the pump 161 which is impressed on the left end of piston 167 increases sufficiently to overcome the effect of the pressure on the right end of piston 163 and the force due to the compression spring 182, the valve piston 163 is moved to the right into its illustrated position so as to connect the passage 135a with the port 178, the groove 173, the port 177, and the conduit 86 to apply the rear clutch 32. At this time the land 164 blocks fluid pressure to the port 177 and conduit 182 and the front brake 33 is thus disengaged, the springs 99 and 99a of the front brake 33 returning the piston 98 to its brake disengaging position. With the front clutch 31 engaged and the rear clutch 32 engaged, the high speed power train is completed.

The pressure in conduit 232 effective on the lower face of the check valve piston 254 increases with the speed of the driven shaft 26, and the pressure from the front pump 160 which is impressed on the upper face of the land 256 decreases with driven shaft speed and increases with the output torque of the vehicle engine. The greater the torque output, therefore, the greater is the tendency for the valve piston 254 to remain in its closed position in which it is illustrated in Figure 2. The check valve piston 254 thus may open at a relatively low speed with a relatively light throttle; but at a relatively heavy throttle, the check valve piston 254 will not open until some higher vehicle speed. As has been previously described, the automatic shift valve piston 163 similarly does not move from its low speed ratio position to its direct drive position until relatively high speeds are reached when there is a relatively high torque output of the engine. This action of the check valve 254 thus assures that the pressure in the conduit 232 and the cavity remains responsive to the speed of the driven shaft 26 until after a change takes place from intermediate speed ratio to high speed ratio. Once the check valve piston 254 has opened, the pressure output of the driven shaft pump 161 increases no further with increases in vehicle speed, and the pump 161 pumps only against that pressure which is maintained in the system by means of the pressure control valve 118.

The transmission may be downshifted from high speed ratio to intermediate speed ratio under the control of the accelerator 155 by moving the accelerator to an open throttle kick-down position. The cam plate 153 is connected with the accelerator 155 by means of the link 154 which is contacted by the accelerator when moved to this position, and the cam plate 153 is formed about its pivot shaft 150 so as to engage the rod 152 with its projection 151 and move the ball valve 195 off its seat. The fluid pressure from the driven pump 161 is thus permitted to flow through the bleed port 196 in the cavity 193 and this causes a controlled reduction in the output pressure of the pump 161. With this reduction in pressure, the line pressure on the right end of piston 163 and the spring 182 are effective up to a certain vehicle speed to move the pistons 163 and 167 to the left which is their intermediate speed positions.

When the valve piston 122 of the selector valve 116 is moved into its "L" position the land 127 of the valve piston 122 blocks the port 135 so that fluid pressure is no longer supplied to the conduit 135a. At this time the land 126 is moved to the left and fluid from conduit 159 enters port 133, the groove 121, the port 132 and the conduit 158 to apply the rear brake 34. Also fluid pressure from conduit 159 enters port 133 and is impressed against the servo-motor of the front clutch through the groove 121, the port 134, and the conduit 83. With the engagement of the front clutch 31 and the rear brake 34, the low speed power train is completed.

With automatic transmissions of the type disclosed herein, braking of the vehicle is oftentimes done by moving the selector lever from its "D" position to its "L" position. At high speeds, a shift into low speed would result in harmful shock to the vehicle and for this reason, means are provided in the present transmission whereby even though the selector lever is moved from its "D" position to its "L" position the transmission cannot be placed in its low speed condition until it has passed through its intermediate position.

With the selector lever valve 122 in its "D" position and the high speed power train completed, a movement of the selector lever to its "L" position can be made without effecting the position of the valve 122 due to the lost motion slot 143. This movement of the selector lever compresses the spring 145 which has a tendency to move the valve to the left as seen in the drawings and into the low speed position. However, at high speed the fluid pressure acting against the piston 139 has a greater force than the spring 145 and consequently, the valve 122 cannot move into its low speed position. When the selector lever is moved into its low speed position at high speeds however, the projection 151 on arm 149 moves the rod 152 to the left to unseat the ball valve 195 the same as in the downshifting operation hereinbefore described, which causes the valve 163 to move to the left and into its intermediate speed position. As the vehicle speed decreases, the fluid pressure impressed upon the piston 139 decreases due to the decrease in the pressure output of the pump 161. When the pressure of the spring 145 and 141 are sufficient to overcome the pressure exerted by the pump 161 on the piston 139, the valve piston 122 will move to the left to its low speed position. The piston 139 thus prevents shifting into the low speed position at high vehicle speeds.

With the manual selector valve 122 in its L position, the transmission can automatically shift from low speed drive to intermediate speed drive and from intermediate speed drive to low speed drive. This automatic shifting of the valve 122 is permitted by the lost motion slot 143 in the link 146 and caused by changing fluid pressure impressed on the piston 139 from the vehicle driven pump 161. As the speed of the vehicle increases in the low speed power train, the pressure from the vehicle driven pump 161 increases and this pressure is impressed on the piston 139 by way of conduits 231 and 232 and port 186. Although the ball valve 195 at this time is open and is permitting the discharge of fluid pressure to the sump through the port 196, the restricted orifice 187 permits a sufficient pressure build up against the piston 139 at a predetermined vehicle speed to overcome the force of the springs 145 and 141 whereby the valve piston 122 moves to the right to the position illustrated which is the intermediate speed position. Conversely, when the speed of the vehicle drops below a predetermined speed, the selector lever being in its L position and the transmission being in its intermediate speed position, the fluid pressure impressed on the piston 139 decreases to a value such that the springs 145 and 141 are sufficient to move the valve piston 122 to the left and back to its low speed position.

The reverse drive power train through the transmission is completed by moving the selector valve piston 122 into its "R" position. The piston 122 in this position connects the port 133 with the port 132 by means of the groove 128 so that the regulated pump pressure from the engine driven pump 160 is applied through the conduits 159 and 158 to the piston 113 to engage the rear brake 34. Regulated pump pressure from the pump 160 is also applied to the conduit 184 and this pressure plus the force of the spring 182 moves the pistons 163 and 167 to the left whereby fluid communication exists between ports 176 and 177 by means of the groove 173. Fluid pressure is thus exerted on the piston 79 to engage the rear clutch 32. Fluid pressure to the piston 79 is communicated from the conduit 159, to the port 133, the groove 128, the port 131, the one-way check valve 157, the conduit 156, the port 176, the groove 173, the port 177, and the conduit 86. The engagement of the rear brake 34 and the rear clutch 32 completes the reverse drive power train. Any fluid pressure that exists in the servo-motor of the front clutch 31 or in the conduit 135a in the valve casing is bled to the sump by means of the port 136 when the valve 122 is moved to its "R" position. Port 136 also vents passage 134 and chamber 200 when the valve 122 is moved to "R" position. This transfers all the fluid reaction to the end of valve 201, increasing the pressure for the reverse servo to avoid the need for extra large or tandem reverse servo pistons.

In reverse, rear brake 34 and rear clutch 32 are engaged due to the variation of line pressure in the conduit 159 as previously described, with the pressure that increases with the opening of the vehicle engine throttle. For reverse drive, however, the driven shaft pump 161 is not operative to supply fluid pressure to the conduit 232 since the driven shaft 26 is rotating in a reverse direction, and the line pressure in the conduit 159 and applied to the servo-motors of the brake 34 and the clutch 32 is not decreased with increases in vehicle speeds. However, this is not important for reverse drive, since no automatic speed ratio changing takes place in the reverse drive and speed variable pressure is not needed for providing smooth ratio changes.

Figure 3 of the drawings discloses a modified control system for the transmission and comprises in general the engine driven pump 160, the vehicle driven pump 161, a manual selector valve 301, an automatic shift valve 302, a vacuum responsive motor 303, a pressure control valve 304 controlled by the vacuum responsive motor 303, and a pressure reducing valve 305.

The manual selector valve 301 comprises a valve system 306 slidably disposed in connected cylindrical cavities 307 and 308 formed in a valve casing 309. The piston 301 is provided with lands 310 and 311 spaced by a groove 312. The cylindrical cavity 307 is provided with ports 313, 314, 315, 316, 317 and 318. The cavity 308 is provided with a port 319. A hollow piston 320 is slidably disposed in the cavity 308 and is adapted to be contacted by an end 321 of the piston 301. A compression spring 322 is disposed between the inner end of the cavity in the hollow piston 320 and an end in the cavity 308. The valve piston 301 is connected by means of a lost motion connection 323 in a link 325 to a lever 324. The lost motion connection between the piston 301 and the lever 324 comprises a slot 325a in the link 325 and a pin 326 in the lever 324. A compression spring 327 surrounds the end of the piston 301 and the link 325. The ends of the spring 327 rest against an end 328 of the land 311 of the piston 301 and a stop 329 provided on the link 325. Lever 324 is swingably mounted on a shaft 330. The lever 324 is provided with a projection 331 adapted to make contact with the end of a rod 332 which will hereinafter be described.

A cam plate 333 is swingably mounted on the shaft 330 adjacent the lever 324, and the plate 333 has a projecting portion 334 also adapted to contact the end of the rod 332 similarly to the lever 324. The cam plate 333 has a link 335 attached thereto and the link is adapted to be contacted by the accelerator or throttle pedal 336 of the vehicle when the accelerator is moved to a full open throttle position. It will be understood that the usual connections (not shown) between the accelerator 336 and the carburetor of the internal combustion engine of the vehicle are provided and, of course, other more elaborate linkage may be provided by the accelerator 336 and the cam plate 333 by means of which the plate 333 is rotated on the shaft 330 to contact the rod 332 when the accelerator is moved to an open throttle position.

The port 319 of the cavity 308 is an exhaust port adapted to freely discharge fluid to sump. The port 314 of cylindrical cavity 307 is connected with conduit 158 for applying fluid pressure for engaging the rear brake 34. One of the ports 315 is connected with the pressure supply conduit 159; the port 316 is connected with the conduit 83 for engaging the front clutch 31; and the port 318 is a bleed port adapted to freely discharge fluid to sump.

The automatic shift valve 302 comprises a piston 337 having lands 338 and 339 of equal diameter and a land 340 having a relatively small diameter. The piston 337 is adapted to abut against a piston 341 adapted to slide in a cavity 342. The lands 338 and 339 of the piston 337 are adapted to slide in a cavity 343 and the land 340 of the piston 337 is adapted to slide in a cavity 344. The land 339 of the piston 337 is hollow and is adapted to receive a compression spring 345 which is adapted to rest in the cavity of the land 339 and abut against a plate 346 fixed to the end of the valve casing 309. The cavity 343 is provided with ports 347, 348, 349, 350 and 351; the cavity 344 is provided with the port 352; and the cavity 342 is provided with the port 353. The port 348 is connected to the port 317 of the manual selector valve 301 by means of the conduit 354; the port 349 is connected to the conduit 182 for supplying fluid pressure for engaging the brake 33; the port 350 is an exhaust port adapted to freely discharge fluid to sump; the port 351 is connected to the port 315 of the manual selector valve 301 by means of the conduit 355; the port 347 is connected to the conduit 86 for supplying fluid pressure to engage the clutch 32; the port 352 is connected to the port 313 of the valve 301; and the port 353 is a bleed port adapted to freely discharge fluid to sump.

Fluid pressure from the vehicle driven pump 161 is adapted to be imposed on the piston 320 and the piston 341 in the cavity 342. For this purpose, a port 356 is provided in the cavity 308 for receiving fluid pressure from the conduit 232. A restricted orifice 357 is provided between the cavity 308 and the cavity 342. A plate 358 is fixed to the valve casing 309 on its left end as seen in the drawings. An orifice 359, sharp-edged on both ends, is provided in the plate 358 and a conical valve element 360 is disposed in the orifice for closing the orifice and this valve element is carried by a resilient bi-metallic strip 361 anchored with respect to the plate 358 by means of a stud 362 extending through the strip and plate. A sharp-edged orifice 363 is also provided in the plate 358 and is adapted to be closed by a valve element 364 carried by a resilient sheet metal strip 365 anchored with respect to the plate 358 by means of a stud 366.

The rod 332, which is adapted to be actuated by the projections 331 on the lever 324 and the projection 334 on the cam plate 333, extends through the plate 346, the valve casing 309, and the plate 358 and is adapted to engage the resilient spring strip 365 to lift the valve element 364 off the orifice 363 when the accelerator is moved to a full open straddle position or the selector lever is moved into its low or reverse positions.

The pressure control valve 304 comprises a piston 367 slidably disposed in connected cylindrical cavities 368 and 369. The piston 367 comprises lands 370 and 371 slidably disposed respectively and the cavities 368 and 369. The cavity 368 is open to the inlet of the engine driven pump 160 and the cavity 369 is open to the conduit 83 by way of a restricted orifice 372. The valve piston 367 is adapted to abut against a seat 373 provided in the valve casing 309.

The vacuum motor 303 controls the pressure control valve 304 and comprises a sheet metal casing 374 having a flexible diaphragm 375 fixed therein. A pair of metal washers 376 and 377 are fixed on opposite sides of the diaphragm 375 by means of a stud 378 extending through the washers and the diaphragm. One end of the casing 374 is connected to the fuel intake manifold 213 of the internal combustion engine of the vehicle by means of a conduit 214 for applying the vacuum present in the manifold 213 on the right side of the diaphragm 375. A spring 379 is provided between the washer 377 and the end of the casing 374 for resisting the action of the vacuum on the right side of the diaphragm 375. A casing 380 is fixed to the casing 374. A bleed port 381 is provided in the casing 380. The casing 380 has a bore 382 adapted to receive a rod 383. One end of the rod 383 is adapted to rest against the stud 378 and the other end of the rod is adapted to seat in a pocket 384 formed in the pressure control valve piston 367.

As seen, the rod 383 is adapted to be actuated by the vacuum present in the manifold 213. The rod 383 is also adapted to be influenced by the fluid pressure from the driven shaft pump 161 and for this purpose, a piston 385 slidably disposed in a cylindrical casing 386 and adapted to be actuated by fluid pressure delivered by way of the conduits 231 and 233 from the driven shaft pump 161, is provided. The piston 385 is adapted to actuate the rod 383 by means of a rod 387 connected to a lever 388. The lever 388 is pivoted as at 389 and is connected to the rod 383. A compression spring 390 within the casing 386 and a compression spring 391 surrounding the rod 383 urge the rod 383 to the left as seen in the drawings so that the rod 383 bears against the piston 370. One end of the spring 391 abuts against the stop 392 on the rod 383 and the other end bears against the casing 380.

Fluid from the engine driven pump 160 is delivered to the torque converter by way of conduits 393 and 394, the pressure in the conduit 394 being reduced to a pre-determined value by the pressure reducer valve 305 and a restricted orifice 404. The pressure reducer valve 305 comprises a piston 395 slidably disposed in a cylindrical cavity 396. The piston 395 is provided with a land 397 slidably fitting within the cavity 396. A compression spring 397a is disposed within the cavity 396 and abuts against the end of the piston 395 as shown. The cavity 396 is provided with grooves 398 and 399 having ports 400 and 401, respectively. The port 401 is connected with the conduit 394 and the port 400 admits fluid to the left side of the piston 395. The cavity 396 has a bleed port 402 which is adapted to freely discharge fluid to sump. A port 403 is provided in the conduit 394 and fluid is delivered through this port for lubricating the transmission.

The fluid in conduit 394 enters the torque converter 30 through the restricted orifice 404, passes through the converter, and is discharged into a conduit 405. A spring loaded valve 406 regulates the fluid pressure and conduit 405. The valve 406 comprises a piston 407 slidably disposed in a cylindrical casing 408. A compression spring 409 tends to seat the valve 407. Two ports, 410 and 411, are provided in the casing 408, both ports being adapted to discharge fluid to sump.

The Figure 3 control mechanism has a different shift sequence as far as the manual selector valve is concerned, the shift sequence in the Figure 3 embodiment being reverse, low, drive and neutral while the shift sequence in the Figure 2 embodiment is low, drive, neutral and reverse.

The control valving shown in Figure 3 provides substantially the same results as that shown in Figure 2. In the Figure 3 embodiment, when the selector valve piston 301 is in its neutral position, the land 310 blocks the ports 315 and any fluid under pressure in the pressure supply conduit 159 is ineffective to provide any actuation of any of the fluid pressure responsive clutches and brakes.

When the selector valve 301 is moved from its "N" position to its "D" position, in which it is illustrated, the intermediate speed drive through the transmission is initially completed, and a subseqeunt change to high speed drive is obtained automatically due to the operation of the automatic shift valve 302. In the "D" position of the selector valve 301, fluid under pressure is supplied from the conduit 159 for applying the front clutch 31 and the brake 33 thus completing the intermediate speed power train.

The pressure in the conduit 159 is regulated by the pressure control valve 304 in the same manner as the pressure in conduit 159 is regulated by the control valve 118 in the Figure 2 embodiment.

As the speed of the vehicle increases with the selector valve 301 in its "D" position, the pressure of the fluid discharged by the pump 161 increases as hereinbefore pointed out. This pressure causes the automatic shift valve to move to the left as seeen in Figure 3 in the same manner as the valve 117 was shifted in the Figure 2 embodiment. The brake 33 is now disengaged and the rear clutch 32 is engaged to thereby complete the high speed power train.

The pressure reducer valve 305 in the Figure 3 embodiment performs the same functions as the pressure reducer valve 120 in the first embodiment. The valve piston 397 moves to the left under the influence of the pressure output of the engine driven pump 160, and the fluid under pressure metered into the torque converter supply conduit 394 is supplied to the left end of the piston 397 through the port 400 augmenting the action of the spring 397a tending to close the valve 305.

The transmission may be down shifted from high speed ratio to intermediate speed ratio under the control of the accelerator 336 by moving the accelerator to an open throttle kick-down position. The cam plate 333 is connected with the accelerator 336 by means of the link 335 which is contacted by the accelerator when moved to this position, and the cam plate 333 has the projection 334, which, in the kick-down position, moves the rod 332 to the left as seeen in Figure 3 and moves the resilient sheet metal strip 365 which in turn moves the valve element 364 off the sharp-edged orifice 363. The fluid pressure from the driven pump 161 is thus permitted to flow through the orifice 363 to sump and this causes a drastic reduction in the output pressure of the pump 161. With this reduction in pressure, the line pressure on the right end of piston 337 and the spring 345 are effective to move the piston 337 and the piston 341 to the left and into the intermediate speed position.

When the selector valve 301 is moved into its "L" position, the land 311 of the valve piston 306 blocks the port 317 so that fluid pressure is no longer supplied to the conduit 354. At this time the land 310 is moved to the left and fluid from the conduit 159 enters ports 315 and is supplied to the groove 312, the port 314, and the conduit 158 to apply the rear brake 34. Also fluid pressure from the conduit 159 enters port 315 and is impressed against the servo motor of the front clutch 31 through the groove 312, the port 316 and the conduit 83. With the engagement of the front clutch 31 and the rear brake 34, the low speed power train is completed.

At relatively high speeds, the selector valve can be moved from its "L" position to its "D" position without affecting the position of the valve 306 due to the lost motion connection 323 in the same manner as was set forth with respect to the lost motion slot 143 of the Figure 2 embodiment.

The transmission is conditioned for reverse by moving the selector valve 301 to its "R" position. The valve 306 is moved to the left and the land 311 blocks the port 316 and its conduit 83 so that the clutch 31 is disengaged. When the land 310 is moved to the left, fluid pressure from the conduit 159 is supplied to the ports 313 and 314. The fluid flows through the port 314 to the conduit 158 and applies the brake 34 while fluid flowing through the port 313 is supplied to the port 352 of the automatic shift valve 302. Fluid from the conduit 159 flows through the port 315 and conduit 355 and is impressed on the right side of the automatic shift valve piston 337 and since the driven shaft pump 161 is ineffective at this time to impose pressure on the piston 341, the pistons 337 and 341 are moved to the left under the influence of the pressure from the conduit 355 thereby communicating the port 352 with the port 347 to apply fluid pressure to the clutch 32 through the conduit 86. With the clutch 32 and the brake 34 engaged the transmission is conditioned for reverse.

The bi-metallic strip 361 is provided for varying the flow of oil through the orifice 359 in accordance with temperature variations of the fluid. The bi-metallic strip 361 functions with colder temperatures to withdraw the valve element 360 out of the orifice 359 so as to increase the effective size of the orifice, and the strip functions to move the valve element farther into the orifice 359 so as to decrease its effective size with higher temperatures. Since the viscosity of the oil increases with a decrease in temperature, the bi-metallic strip 361 compensates for such viscosity increase to tend to maintain the fluid pressure imposed on the pistons 320 and 341 constant regardless of temperature changes in the oil.

I wish it to be understood that my invention is not to be limited to the specific constructions and arrangements shown and described, except only insofar as the claims may be so limited, as it will be understood to those skilled in the art that changes may be made without departing from the principles of the invention.

I claim:

1. In a transmission, the combination of a drive shaft, a driven shaft, means for providing a low speed power train between said shafts, means for providing an intermediate speed power train between said shafts, means for providing a high speed power train between said shafts, means for selectively effecting said power trains and including a manual selector valve having a low speed position and an intermediate speed position, a selector lever under the control of the operator of the vehicle for actuating said selector valve and having a low speed position and an intermediate speed position, a shift valve having an intermediate position and a high speed position, means responsive to the speed of said driven shaft for providing a fluid pressure that increases with the speed of said driven shaft and applied to said shift valve to shift said valve from its intermediate position to its high speed position, said fluid pressure also being applied to said manual selector valve tending to hold said selector valve in its intermediate position, means associated with said manual selector valve and said selector lever whereby said selector lever may be moved from its intermediate speed position to its low speed position without moving said selector valve, and valve means actuated by said selector lever when it is moved from its intermediate speed position to its low speed position for venting said fluid pressure applied to said shift valve and slowly relieving said fluid pressure from said selector valve whereby said shift valve moves to its intermediate speed position and said manual selector valve subsequently moves to its low speed position.

2. In a transmission, the combination of a drive shaft, a driven shaft, means for providing a low speed power train between said shafts, means for providing an intermediate speed power train between said shafts, means for providing a high speed power train between said shafts, means for selectively effecting said power trains and including a manual selector valve having a low speed position and an intermediate speed position, a selector lever under the control of the operator of the vehicle for actuating said selector valve and having a low speed position and an intermediate speed position, a shift valve having an intermediate position and a high speed position, means responsive to the speed of said driven shaft for providing a fluid pressure that increases with the speed of said driven shaft and applied to said shift valve to shift said valve from its intermediate position to its high speed position, said fluid pressure also being applied to said manual selector valve tending to hold said selector valve in its intermediate position, a lost motion connection associated with said manual selector valve and said selector lever whereby said selector lever may be moved from its intermediate speed position to its low speed position without moving said selector valve, and valve means actuated by said selector lever when it is moved from its intermediate speed position to its low speed position for venting said fluid pressure applied to said shift valve and slowly relieving said fluid pressure from said selector valve whereby said shift valve moves to its intermediate speed position and said manual selector valve subsequently moves to its low speed position.

References Cited in the file of this patent

UNITED STATES PATENTS 2,737,824    Livermore _____ Mar. 13, 1956